Figure 1:
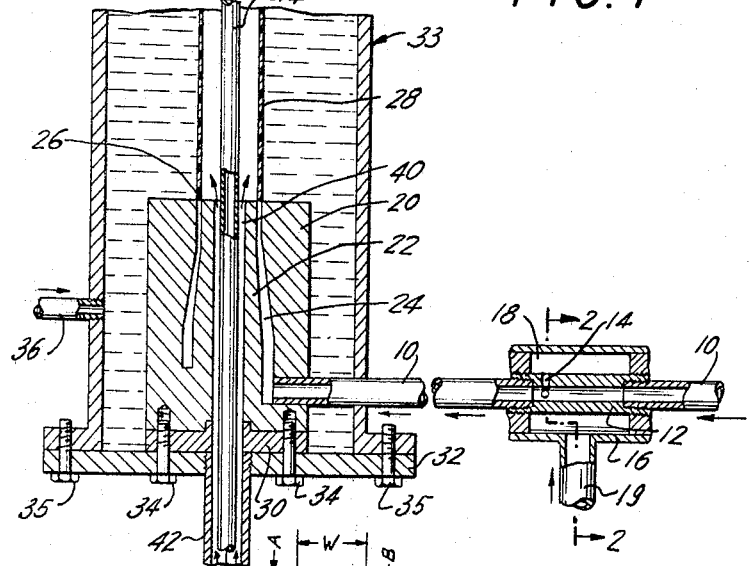

Aug. 1, 1967 H. MAJEWSKI ET AL 3,334,168
METHOD OF AND APPARATUS FOR PRODUCING STRIPED CASINGS
Filed Dec. 5, 1963 3 Sheets-Sheet 1

INVENTORS
HENRY MAJEWSKI
LOUIS L. WINOKUR
BY
ATTORNEY

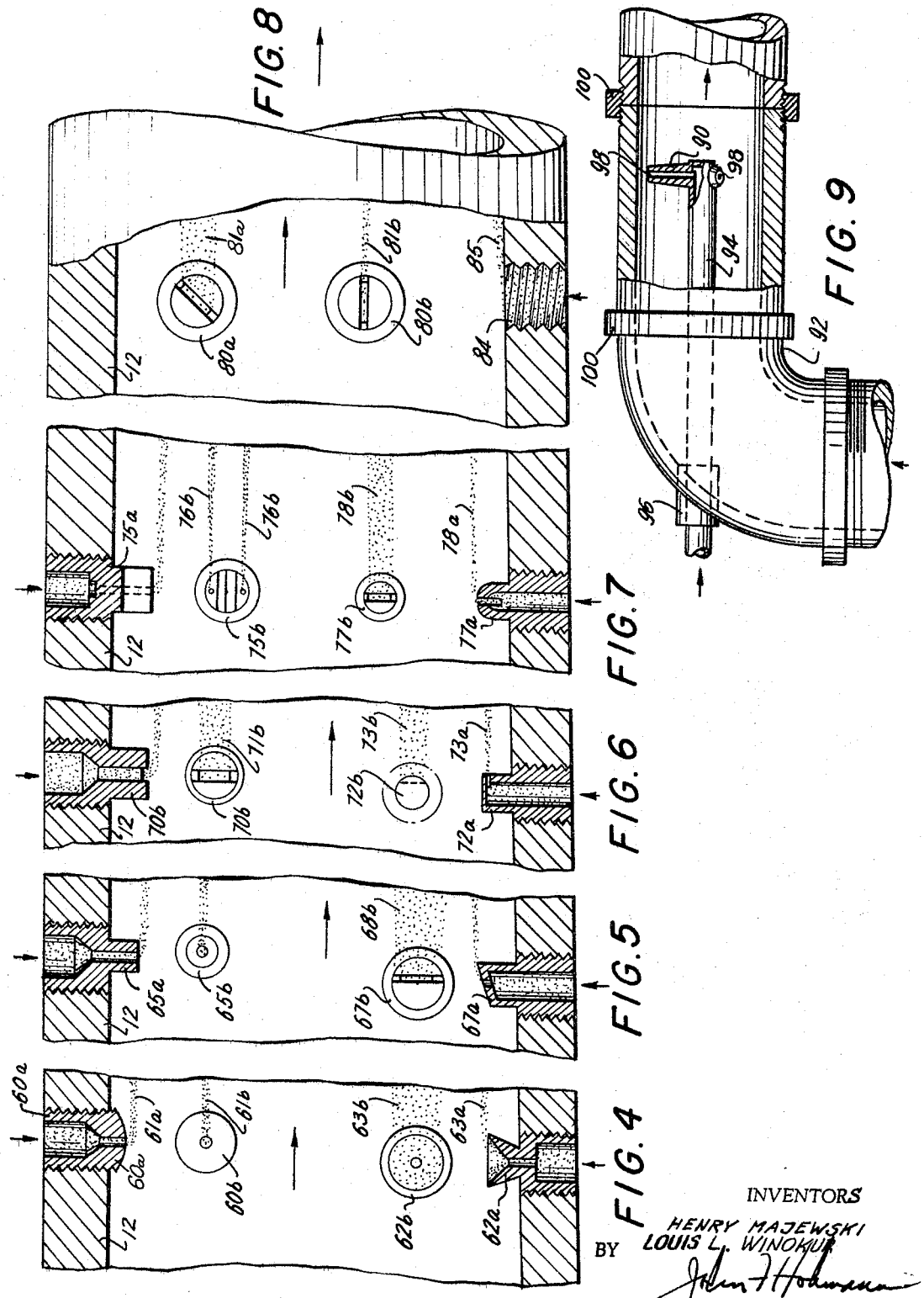

United States Patent Office 3,334,168
Patented Aug. 1, 1967

3,334,168
METHOD OF AND APPARATUS FOR
PRODUCING STRIPED CASINGS
Henry Majewski, Chicago, and Louis L. Winokur, Evanston, Ill., assignors to Union Carbide Corporation, a corporation of New York
Filed Dec. 5, 1963, Ser. No. 328,234
23 Claims. (Cl. 264—173)

This invention relates to the sausage casing art and more particularly, to a method and apparatus for making a sausage casing whose presence on a sausage can be readily detected.

In the production of skinless frankfurters, a transparent cellulosic casing, such as produced by the viscose process, is stuffed with a sausage meat emulsion and the stuffed casing is successively linked, cured as by smoking, cooked, chilled, and finally peeled from the individual frankfurters. The individual frankfurters are then packaged and shipped.

The peeling operation is generally performed mechanically by automatic peeling machines. In these machines, the frankfurters, after passing through the zone of action of the peeling operation are conveyed by a belt to a collection device, or to a station where the frankfurters are packaged for shipment. Though such peeling machines are highly efficient, nevertheless, they do not peel the casings from all the frankfurters on which they operate. Because of the transparency of the casing, the encased frankfurters and the skinless frankfurters are very similar in appearance, and acute visual perception is required to separate the encased frankfurter from the skinless frankfurters.

Sausage casings have been provided with markings, such as stripes, so that their presence on sausages could be readily detected. These stripes are conventionally at the outer surface of the casing where they are susceptible to abrasion and crocking which causes accumulation of the pigment from the stripe on the hand of the stuffing operator, and on machine parts in contact with the casing in mechanical stuffing and peeling equipment. This transfer of pigment is objectionable for sanitary reasons, and can cause malfunction of the mechanical equipment.

It has now been found that the casings can be readily provided with markings which not only are readily detectable, but which are also abrasion resistant.

According to the present invention, a method is provided for producing casings having stripes which are integrally formed and totally imbedded within the casing wall. A clear, rod-like mass of viscose is fed through a first zone and into a second zone. The direction of flow within said second zone is angularly offset from the direction of flow within the first zone, conveniently in the order of about 90 degrees. The mass of viscose is extruded from the second zone in the form of a continuous tubular casing.

Within the first zone, striping viscose is inserted into the stream of clear viscose, completely below the surface thereof and in the region which is radially offset from the sextant of the rod-like mass of clear viscose farthest from the extrusion outlet in the second zone.

The clear viscose and the embedded striping viscose are extruded through the outlet from the second zone and passed into a coagulating and regenerating bath, wherein the striping viscose is coagulated and regenerated in situ and simultaneously with the tubular viscose mass, producing stripes which are imbedded within the regenerated cellulose of the casing and forming a unitary and integral product.

A further aspect of the present invention involves an apparatus for producing cellulosic tubing having imbedded stripes. A supply line through which a fluid mass can be fed, is connected in series with an extrusion nozzle which has a tubular passage which terminates in an annular orifice. The extrusion nozzle and the tubular supply line are angularly offset from each other, conveniently at right angles.

The tubular supply line is provided with at least one striping inlet member through which striping material can be fed into the fluid mass which flows through the tubular supply line. The outlet from the striping member is positioned interiorly of the tubular supply line and is preferably, at least about 1/32 of an inch below the inner surface of the tubular supply line.

All striping inlet members are positioned at a point no greater than about 150 degrees from the point on the side of the tubular supply line which is closest to the extrusion nozzle outlet, in order to provide an apparatus which is capable of producing entirely imbedded stripes.

Figure 3:
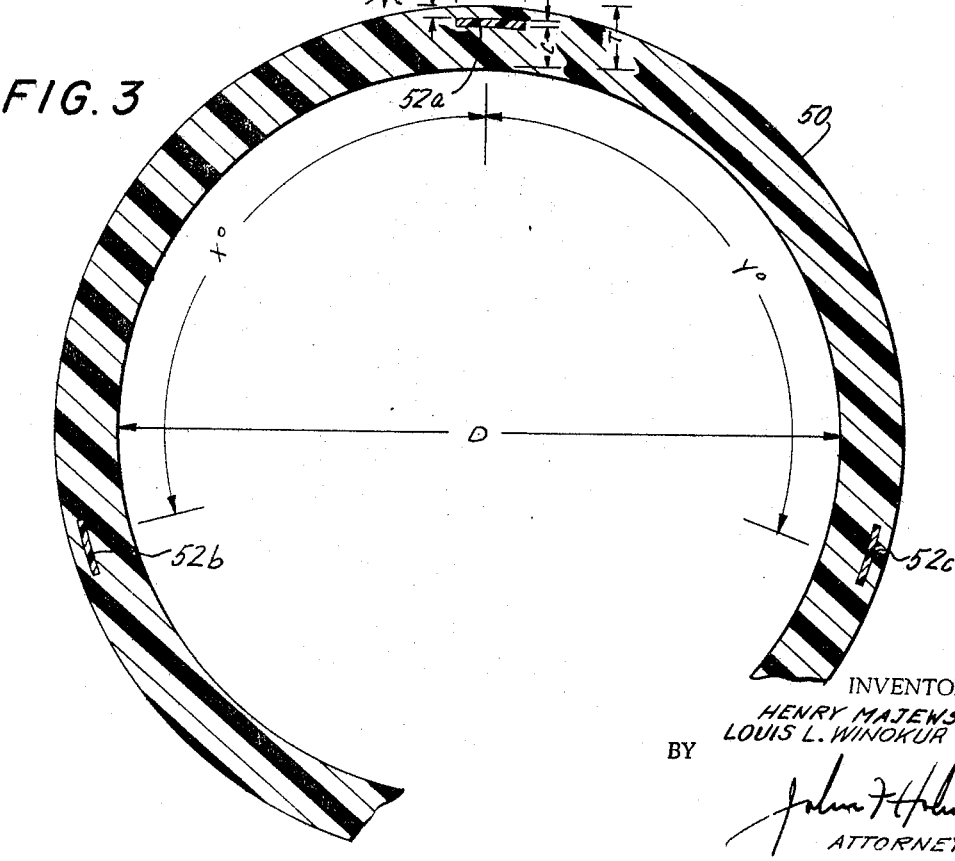
Figure 2:
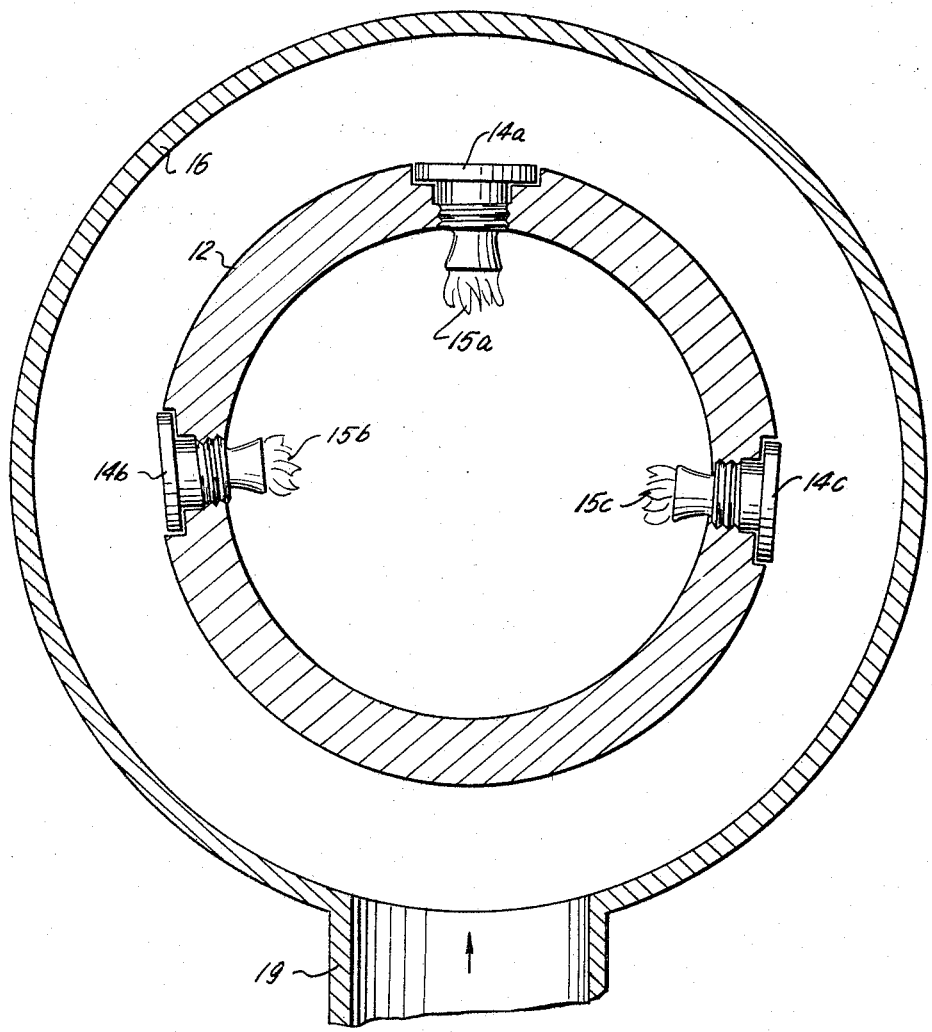

The details of and the manner in which the invention can be practiced will become more apparent from the following description taken in consideration with the accompanying drawings illustrating specific embodiments and forming a part of this specification and wherein:

FIGURE 1 is a sectional view of an upward extrusion apparatus for producing cellulosic tubing in combination with means for applying the striping viscose, FIGURE 2 is a section taken on lines 2—2 of FIGURE 1, FIGURE 3 is an enlarged sectional view of a striped seamless cellulosic tubing, FIGURE 4 is a side elevational view, partly in section, of a jet containing tubular supply member, FIGURES 5, 6, 7 and 8 are side elevations of modified forms of jet containing tubular supply members, and FIGURE 9 is a side elevational view, partly in section, of a modification of the tubular supply member and striping inlet means of FIGURE 1.

Referring now to the drawings wherein like reference numerals designate like parts, the reference numeral 10 designates a viscose supply line which supplies clear viscose, under pressure, from a suitable source of supply, not shown, to an upward extrusion apparatus for producing seamless cellulosic tubing. As shown in FIGURE 1, supply line 10 is provided with a fitting including a sleeve 12 having a row of circumferentially spaced jet-type striping members 14 in the peripheral wall thereof. Each inlet member 14 supplies striping viscose in the form of a stripe and the number of inlet members 14 will depend on the number of stripes desired in the product. For convenience, three such orifices are shown in the embodiment illustrated in FIGURE 2 of the drawings.

The fitting also includes a jacket 16 which cooperates with sleeve 12 to provide a chamber 18 to which striping viscose is supplied under pressure through an inlet 19 connected to a suitable source of supply, not shown. The striping viscose introduced into chamber 18 passes through the inlet members 14 and into the flowing clear viscose mass, and the resulting striped viscose is fed through line 10 to an upwardly extruding apparatus.

The extrusion apparatus is provided with an extrusion nozzle having a cup 20 and a core 22 disposed in a spaced relationship in order to provide a tubular or annular passage 24 terminating in an annular orifice 26 through which the striped viscose mass is extruded in the form of a seamless tubing 28. The cup 20 is seated in flange 30 of core 22 which flange is disposed on a suitable stationary support 32, and the screws 34 secure cup 20 and core 22 to support 32.

The extrusion nozzle is disposed in reservoir 33, which in turn is disposed on and secured to support 32 by screws 35 and to which coagulating and regenerating solution is continuously supplied through an inlet 36. An outlet 38 maintains the level of the coagulating and regenerating solution in the reservoir 33. By this construction, the striped viscose mass is extruded through the annular orifice 26 directly into the coagulating and regenerating bath.

The coagulating and regenerating solution is supplied to the interior of the extruded tubing 28 through the passage 40 communicating with supply pipe 42 to the bottom of which solution is continuously fed from a suitable source of supply, not shown. An overflow drain pipe 44 disposed within supply pipe 42, can serve to maintain the level of the solution within tubing 28. The tubing 28 is withdrawn from the bath and processed and dried as well known in the art to a flattened tubing from which cellulosic sausage casings are obtained.

As apparent from FIGURE 1, the rod-like, striped viscose mass upon introduction to the nozzle is converted into tubular form by passage 24 prior to extrusion through the annular orifice 26. The exact flow pattern in the transition from a rod-like mass to a tubular mass with the simultaneous change in flow direction, does not lend itself to either a clear description or a complete analysis. It has been found, however, that as the mass of striped viscose transforms from a rod-like mass in supply line 10 to the tubular mass in passage 24, all stripes in the viscose mass, which are angularly offset from the uppermost point of the mass entering the nozzle, will be angularly displaced. When spaced stripes are required in the product, the jets 14 must be spaced so as to compensate for the angular displacement of any stripes during the passage from the supply line 10, to the nozzle.

The term "uppermost point" refers to the structural orientation of the apparatus, as shown in FIGURE 1, wherein the extrusion nozzle 20, is at a right angle and vertically disposed, relative to the horizontally disposed tubular supply line 10. The critical factor is that the point on the rod-like mass which faces toward, that is, is closest in elevation to the outlet 26, of the extrusion nozzle 20, should be considered the 0° point.

The jet 14a, as shown in FIGURE 2, is at 0° while the jets 14b and 14c are spaced about 90° therefrom. The resultant casing, such as casing 50, of FIGURE 3, will have stripes which are positioned such that the distances X and Y are each about 105°. The positions of jets with respect to the uppermost point of the rod-like mass, and the resultant stripe displacements are tabulated below, for a casing one inch diameter and about 1 mil thick, produced in an apparatus having about a one half inch diameter supply line:

| Jet, deg.: | Stripe, deg. |
|---|---|
| 0 | 0 |
| 20 | 25 |
| 40 | 50 |
| 60 | 75 |
| 80 | 95 |
| 100 | 120 |
| 120 | 140 |
| 140 | 165 |
| 150 | 180 |
| 150+ internal surface formed from viscose in this area. | |

The amount of displacement will vary to some extent, as a result of variations in the flow rate of the clear viscose, the insertion depth of the stripe as well as a result of changes in the apparatus such as variations in the angle of offset between the extrusion nozzle and the tubular supply line and relative dimensions of the parts of the apparatus.

It is apparent from the foregoing tabulation that the internal surface portion of the casing structure is formed from viscose in the lowest sextant of the rod-like mass of viscose.

The term "lowest sextant" of the rod-like mass, refers to the zone of about 60° spaced 150° from the 0° point on the rod-like mass.

The internal surface of the casing is also formed from an interior rod-like portion of viscose, co-axial with the rod-like mass of viscose. The interior rod-like portion normally has a diameter of approximately one-half that of the rod-like mass.

The stripes must be below the surface of the finished casing, and therefore, the outlets from the jets 14a, 14b and 14c should project into the tubular supply line 10, a distance equal to about 0.025 inch and prefarably, a distance equal to from about $\frac{1}{20}$ to $\frac{1}{4}$ of the diameter of the tubular supply line 10. Generally, distances from at least about $\frac{1}{32}$ to about $\frac{3}{32}$ of an inch give the desired results in the commonly employed half-inch diameter tubular supply lines.

As noted above, the outlets preferably do not project more than about $\frac{1}{4}$ of an inch into a one inch diameter supply line, in order to insure that the material is always embedded in the body of the cellulose casing. Jet outlet depths from about $\frac{3}{32}$ to $\frac{5}{32}$ of an inch have been found to give the desired result, and were preferred because of the fact that the resultant stripe, as seen in FIGURE 3, will be positioned such that the dimension C will be equal to at least about 50% of the overall thickness T.

To produce, for example, a casing having a film thickness of about 1 mil, and a diameter of about 1 inch, with three spaced stripes, a clear viscose of the type employed for the production of cellulosic sausage casing is delivered under pressure as normally used in the production of cellulosic tubing by the viscose process, to the one half diameter supply line 10 provided with a tubular fitting in which the sleeve 12 has three jet-type inlet members 14. Each jet has an outlet diameter which is determined by the required stripe width and which could for example, be about $\frac{2}{16}$ of an inch in order to produce stripes up to about $\frac{9}{32}$ of an inch in width. The outlet of the jet is advantageously about $\frac{2}{32}$ of an inch below the innermost surface of sleeve 12, which has a half inch diameter.

The jet 14a, as shown in FIGURE 2, is at the 0° point of sleeve 12 and the jets 14b and 14c are angularly offset with respect to the jet 14a by a distance of about 90 degrees.

As further shown in FIGURE 2, the black striping viscose delivered from the jets 14a, 14b and 14c will be deposited below the surface of the clear viscose which is traveling within the sleeve 12. The striping viscose 15a, 15b and 15c from the respective jets normally cannot penetrate deeply into the clear viscose due to the substantially equal and relatively high viscosity of the striping and clear viscose. Thus, while increasing the pressure on the striping viscose can to some extent force the striping viscose into the clear viscose, the depth of penetration of the striping viscose is primarily determined by the depth of penetration of the jets into the clear viscose.

As shown in FIGURE 3, the stripes 52a, 52b and 52c will be completely imbedded within the wall of the cellulosic casing 50. Jets such as shown in FIGURE 2 and having outlet diameters of $\frac{2}{16}$ of an inch can produce stripes having a width in the range of from about $\frac{2}{32}$ to $\frac{9}{32}$ of an inch. Obviously, the greater the pressure on the black striping viscose and the greater its rate of flow, the greater will be the width of the resultant stripe. In a casing 50 having a thickness of 1 mil, the stripe can be positioned, for example, such that the distance C between the stripe and the inside surface of the casing is approximately $\frac{6}{10}$ of a mil and the distance A between the stripe and the outer surface of the casing is about $\frac{2}{10}$ of a mil. The thickness B of the stripe would, of course, be about $\frac{2}{10}$ of a mil. The distances A and C, as indicated in FIGURE 3, can be varied by increasing or decreasing the depth to which the jet penetrates into the clear viscose, while the thickness B of the stripe can be regulated by controlling the amount of striping viscose delivered by the jet.

It is apparent that in the production of tubular casings having low wall thicknesses, insertion of the striping material into the casing wall after the wall has been formed, presents extreme difficulties because of the extremely small dimension encountered and has only limited adaptability to existing operations. In spite of the difficulties which arise due to the right-angle transition from a rod shaped mass to a tubular shaped mass it is seen that the accurate positioning of a stripe both in respect to angular orientation and depth can be attained through the use of the jet-type of striping apparatus.

The configuration of the jet will influence the sharpness and density of the stripe, as well as the depth of the stripe.

FIGURES 4, 5, 6 and 7 show various configurations of jets and the types of stripes produced by the various jet configurations. While the figures show the use of jets in specific combinations, it is to be understood that such combinations are made by way of illustration only. The selection of a particular combination of jets as well as the use of jets which are all of one type, is determined by the requirements of the particular application.

A jet 60a or 60b, as shown in FIGURE 4 having a small outlet diameter of for example, approximately $\frac{1}{32}$ of an inch can be employed to produce narrow stripes 61a and 61b having a width in the range from approximately $\frac{1}{32}$ to $\frac{4}{32}$ of an inch.

Advantageously, funnel shaped jets 62a and 62b can be employed. These jets correspond to the jets 14a, 14b and 14c as shown in FIGURE 2.

The funnel or tapered jets members 14a, 14b and 14c are noted to be provided with an enlarged base section which corresponds in size to an enlarged recess in the sleeve 12. The use of a jet having a small inner diameter of about $\frac{1}{16}$ of an inch at the base of the funnel, and a large inner diameter of about $\frac{2}{16}$ of an inch at the outlet of the funnel can be employed to produce wide, dense stripes 63a and 63b having widths from at least about $\frac{3}{32}$ to about $\frac{9}{32}$ of an inch.

The tapered jet configuration provides minimum interference with the flow of the clear viscose in the zone between the striping viscose and the inner wall of the sleeve 12, thus minimizing the turbulence in this area, while simultaneously providing a wide outlet capable of producing wide stripes. Tapered jets are capable of producing sharply defined stripes which when viewed in cross-section as seen, for example, in FIGURE 3, reveal a thickness B, which is consistent and uniform. The thickness A, of clear viscose between the stripe and the outer wall of the casing is consistently free of striping viscose which has migrated.

In the production of narrow stripes, the jets 60a and 60b can be modified and can have a configuration in the manner of jets 65a and 65b of FIGURE 5. The inner diameter of the jet and the outlet section can be maintained in the range, for example, from about $\frac{1}{16}$ to $\frac{1}{32}$ of an inch, while the outside diameter is maintained just large enough to provide adequate structural strength. The jets 65a and 65b, are thus seen to expose a minimum surface which can interfere with the flow of clear viscose. The threaded base portion of the jet member is not in the flow path of the clear viscose and, therefore, the dimensions of this portion of a jet member is determined only by requirements encountered in providing a convenient and secure interfit between the sleeve 12 and the jet, as for example, by means of the commonly employed expedient of a thread. The production of a wide stripe such as 68b, can be accomplished through the use of a slot type of orifice such as seen in the jet 67b of FIGURE 5. Offsetting the surface of the outlet portion of a jet at an angle to the direction of flow of the clear viscose as seen in jet 67a provides a wiping action of the clear viscose against the outlet.

The slot type of outlet can also be provided in the side wall of the jet such as seen in the jet 72a of FIGURE 6. The stripe 73a, produced by the jet 72a will have a thickness which closely corresponds to the width of the opening of the slot. Correspondingly, the width of the stripe 73b will correspond to the length of the opening of the slot as seen in the jet 72b.

While jets having single outlets have been shown, jets having multiple openings can also be employed. As shown in FIGURE 7, a jet 75a is provided with a plurality of legs. Each leg contains a passage which communicates at one end with the striping viscose supply source and at the other end communicates with the clear viscose material. As seen in respect to the jet 75b, the use of 2 legs, each having a single opening will produce a pair of stripes 76b. While each one of the stripes produced by the legs of the jet 75a or 75b is only slightly displaced from an adjacent stripe, a clear demarcation between stripes can be produced by providing a deep groove between the legs. The groove may be tapered or rectangular in cross-section and should extend at least half way between the outlet end of the jet and the inner wall of the sleeve 12, in order to provide for an adequate flow of clear viscose between the legs.

As a further modification, the outlet section of the jet can be provided with a hemispherical configuration. The jets 77a and 77b as shown in FIGURE 7, are provided with slot type orifices and will produce stripes 78a and 78b which correspond approximately in width to the diameter of the slot.

As shown in FIGURE 8, the width of the stripe produced by a slot type orifice can be varied by changing the angular orientation of the orifice. The jet 80a having a slot orifice which is offset about 45 degrees from the direction of flow of the clear viscose will produce a stripe 81a which is narrower in width than the stripe 71b produced by a jet 70b having the same orifice dimensions as jet 80a, but positioned perpendicularly to the direction of flow of the clear viscose. At the other extreme, a very narrow stripe 81b can be produced by having the slot orifice of a jet 80b positioned in the same direction as the flow of the clear viscose.

The striping viscose 85 introduced through the orifice 84, can be imbedded within the clear viscose to some extent through the use of a substantially higher pressure on the stripe viscose than on the clear viscose. However, as previously noted, the substantially equal, and relatively high viscosities of the clear and striping viscose preclude the deep penetration of the striping viscose into the clear viscose. Moreover, the turbulent flow which results from the friction between the clear viscose and the inside surface of the sleeve 12 will produce a stripe which is to some extent within the clear viscose, but which also has at least a portion thereof coextensive with the outer surface of the clear viscose, and to this extent not imbedded within the clear viscose.

As shown in FIGURE 9, the striping inlet jets 90 can be positioned completely interiorly of the tubular supply line 92. The striping material can be supplied through conduit 94 which may be rotatably carried by a packing member 96. Thus, the positions of the stripes can be angularly shifted if desired, and wavy lines can be produced by continuously moving the conduit 94, and consequently the outlets 98 of the jets 90, through an arc of, for example, 10°.

The threaded annular connectors 100 permit the removal of a section of the supply line and provides for access to the jets 90. The jets may thus be interchanged in order to provide variability of jet configuration and/or length.

The viscose of the striping viscose and the clear viscose are compatible and thus unite, without interfaces, at their contacting surfaces, so that when the striped mass is coagulated and regenerated, the product is a coherent regenerated cellulosic unit having stripes.

The striping viscose can be a viscose which is opaque, or which at least will yield optical or other characteristics different from that of the viscose constituting the major portion of the product. Examples of materials incorporated in the striping viscose which are suitable are pigments, particularly carbon black and titanium oxide, to form opaque stripes; dyes, to form colored stripes; scintillating materials, such as mica, to form stripes of metallic appearance; fluorescent materials, such as β-methyl umbelliferone, fluorescein and erythrosin to form stripes which fluoresce under ultraviolet light; magnetic materials, such as iron and iron oxide powder to form stripes that can be detected by electronic means; etc.; and mixtures of any of the foregoing with each other.

In carrying out the process, a striping viscose composed of a viscose similar to the clear viscose but having an additive such as 0.8% titanium dioxide or carbon black based on the weight of striping viscose homogeneously incorporated therein is delivered to chamber 18 of fitting at a pressure higher than the pressure of the clear viscose and is forced through jets 14 and below the surface of the clear viscose mass passing therethrough. The clear viscose supply pressure may be on the order of 40 pounds per square inch (p.s.i.) as compared to a 42 to over 80 p.s.i. pressure on the striping viscose. The striped viscose mass then passes through the nozzle and is extruded as a seamless tubing 28 into the coagulating bath, where it is coagulated and then regenerated, washed, softened, dried, and flattened in the usual manner.

Tests were run on casings provided with black stripes, to demonstrate abrasion and crocking resistance of the stripes. Carbon black was mixed with viscose in order to produce the striping material. A conventional stuffing horn and automatic sizing apparatus was clamped in place on a laboratory bench, and an automatic peeler was positioned in line with the discharge end of the stuffing horn. A small squeeze roll assembly was mounted on the peeler in a location such that the casing may be drawn off the stuffing horn through the automatic sizing apparatus, between the squeeze rolls, and around the driven roll of the automatic peeler which provides the drive for the unshirring operation.

An air line was inserted in the stuffing horn in order to inject air at low pressure while the casing was being unshirred. This serves to inflate the casing between the automatic sizing apparatus and the squeeze rolls, thus maintaining the casing in firm contact with the automatic sizing apparatus. A swatch of cotton toweling was placed on one segment of a rubber holdback section of the automatic sizer.

Shirred casings to be tested were placed on the stuffing horn, then laced as described above and unshirred at maximum peeler speed of 175 ft./min. During the unshirring operation, one stripe was manually guided and maintained in contact with the cotton swatch. When unshirring was completed, this swatch was removed for evaluation as to the amount of carbon black present.

By this method, it was possible to obtain reproducible results on the "crocking" or "rub-off" tendency of various types of casings.

The test showed that the casings with internally contained stripes were free from rub-off whereas in conventional striped casings, a considerable amount of carbon black can be rubbed off the external surface of the casing.

Though in the preferred form, the invention is applied to seamless tubing made of regenerated cellulose by the viscose process, it can also be applied to the production of seamless tubing made of other cellulosic materials, typical examples of which are cellulose ethers such as ethyl cellulose, cellulose glycollate, cuprammonium cellulose, denitrated cellulose nitrate, deacetylated cellulose acetate, cellulose acetate, etc. It is, of course, understood that with any cellulosic material, the striping compositions will contain a compatible material and preferably the same base material as that which is to constitute the major portion of the product.

Although the invention has been described in its preferred forms with a certain degree of particularity, it is understood that the present disclosure of the preferred forms has been made only by way of example, and that numerous changes in the details of construction and the combination and arrangements of parts may be resorted to without departing from the spirit and the scope of the invention.

What is claimed is:

1. A method for producing thin walled tubings having stripes which are integrally formed and totally imbedded within the thin wall comprising the steps of feeding a clear, rod-like coagulable mass through a first zone and into a second, the direction of flow within said second zone being angularly offset from the direction of flow within the first zone, inserting striping material into the stream of the clear rod-like mass, totally below the surface thereof while in said first zone and, in the region of said mass which is angularly offset from the sextant of said mass farthest from the extrusion zone, and extruding said mass from the second zone in the form of a tubing and thereafter regenerating and coagulating said tube to form a continuous thin wall tubing.

2. The method of claim 1, wherein the direction of flow of said mass in the first zone, is approximately normal to the direction of flow of said mass in the second zone.

3. The method as set forth in claim 1, wherein a plurality of narrow streams of the striping material are incorporated into said mass within said first passage at a depth of at least about 1/32 of an inch below the surface of said mass.

4. The method of claim 1, wherein the striping material is incorporated below the surface of said mass, a distance which is no greater than substantially one fourth the diameter of the rod-like mass.

5. A method of producing striped artificial sausage casings comprising continuously passing a rod-like stream of coagulable cellulosic mass through a first passage, continuously incorporating at least one stream of a striping composition below the surface of said mass as it passes through said first passage, the base of said striping composition being compatible with said cellulosic mass and containing a material which imparts characteristics different and detectable from said mass, thereafter continuously passing the rod-like composite cellulosic mass containing said incorporated striping material through an annular passage to form a tubular stream, annularly extruding said tubular stream to form seamless tubing, and then coagulating and regenerating the coagulable cellulose in said tubing, the direction of flow of the cellulosic mass through said first passage being angularly offset with respect to the flow through said annular passage and maintaining the sextant of the cellulosic mass within said first passage which is farthest from the annular outlet from said annular passage free of striping material.

6. A method for producing striped continuous thin walled casings comprising the steps of feeding a clear rod-like mass of viscose through a first zone and into a second zone, the direction of flow within said second zone being angularly offset from the direction of flow within the first zone, and incorporating a striping viscose below the surface of the rod-like mass within said first zone, the striping viscose entering the clear viscose at a point which is angularly displaced from the sextant of the rod-like mass of clear viscose farthest from the outlet from the second zone, which entering point is radially displaced at least about one fourth the distance from the center of the rod-like mass of clear viscose to the surface of said rod-like mass.

7. The method of claim 6, wherein the direction of flow of viscose in the first zone, is approximately normal to the direction of flow of viscose in the second zone.

8. The method of claim 6 wherein said striping viscose enters said clear viscose through a plurality of radially displaced entering points.

9. An apparatus for use in the producing of cellulosic tubing having imbedded stripes comprising an extrusion nozzle; a supply line through which a coagulable fluid mass can be fed; said supply line being connected in series with said extrusion nozzle, and said extrusion nozzle being angularly offset from said supply line, said extrusion nozzle having a tubular passage which terminates in an annular orifice; and at least one striping inlet member in the wall of said supply line, said inlet member being positioned at a point less than approximately 150 degrees from the point on the side of the tubular supply line which is closest to the extrusion nozzle outlet.

10. The apparatus of claim 9 wherein said striping inlet member projects into the supply line beyond the inner surface thereof a distance of less than about ¼ of the inside diameter of the supply line.

11. The apparatus of claim 9, wherein said striping inlet member has a first section within the wall of said supply line, a second section disposed interiorly of the supply line, an inlet to said first section, an outlet from said second section and conduit means in said first section and said second section providing communication between said inlet and said outlet, at least a portion of the conduit means in said second section having a taper which diverges in the direction of said outlet.

12. The apparatus of claim 9, wherein the outlet from said stripe inlet member has an elongated configuration.

13. The apparatus of claim 9, wherein said tubular supply line and said extrusion nozzle are approximately at right angles.

14. The apparatus of claim 9 wherein the wall of said supply line contains a plurality of radially disposed inlet members.

15. The apparatus of claim 11, wherein at least a portion of said second section has a taper which converges in the direction of said first section.

16. The apparatus of claim 11, wherein said second section is bifurcated, each leg of the bifurcated second section having an outlet and conduit means providing communication between said inlet to said first section and said outlet.

17. The apparatus of claim 16, wherein the separation between each leg of said second bifurcated section extends at least about one half the distance between the outlet end of the second section and the inner wall of said tubular supply line.

18. An apparatus for use in the producing of cellulosic tubing having imbedded stripes comprising: an extrusion nozzle; a tubular supply line through which a coagulable fluid mass can be fed; the outlet end of said tubular supply line being connected to the inlet end of said extrusion nozzle, and being angularly offset from said tubular supply line said extrusion nozzle having a tubular passage which extends the length thereof and which terminates in an annular orifice, and at least one striping inlet member in the wall of said tubular supply line, said striping inlet member being positioned at a point less than approximately 150 degrees from the point on the side of the tubular supply line which is closest to the extrusion nozzle outlet.

19. The apparatus of claim 18, wherein said tubular supply line and said extrusion nozzle are approximately at right angles.

20. The apparatus of claim 18 wherein said striping inlet member projects into said tubular supply line beyond the inner surface thereof a distance less than about ¼ of the inner diameter of the tubular supply line.

21. An apparatus for use in the producing of cellulosic tubing having imbedded stripes comprising: an extrusion nozzle; a supply line through which a coagulable fluid mass can be fed; the outlet end of said supply line being connected to the inlet end of said extrusion nozzle, and being angularly offset from said supply line, said extrusion nozzle having a tubular passage which extends the length thereof and which terminates in an annular orifice, and at least one striping inlet member having an outlet within said supply line, said inlet member being positioned at a point less than approximately 150 degrees from the point on the side of the tubular supply line which is closest to the extrusion nozzle outlet.

22. The apparatus of claim 21, wherein said supply line and said extrusion nozzle are approximately at right angles.

23. The apparatus of claim 21, wherein said striping member outlet is spaced from the inner surface of said supply line, a distance equal to less than about ¼ of the inner diameter of the supply line.

References Cited
UNITED STATES PATENTS

| | | | |
|---|---|---|---|
| 2,043,455 | 6/1936 | Voss et al. | 18—15 |
| 2,097,684 | 11/1937 | Atkinson | 18—15 |
| 2,803,041 | 8/1957 | Hill et al. | 18—12 |

ROBERT F. WHITE, *Primary Examiner.*

G. AUVILLE, *Assistant Examiner.*